(12) United States Patent
Viala

(10) Patent No.: US 7,902,508 B2
(45) Date of Patent: Mar. 8, 2011

(54) SELECTABLE FIELD MOTION DETECTOR

(75) Inventor: Roar Viala, Banyuls Sormer (FR)

(73) Assignee: The Watt Stopper Inc, Santa Clara, CA (US)

( * ) Notice: Subject to any disclaimer, the term of this patent is extended or adjusted under 35 U.S.C. 154(b) by 165 days.

(21) Appl. No.: 12/220,033

(22) Filed: Jul. 21, 2008

(65) Prior Publication Data

US 2010/0012016 A1    Jan. 21, 2010

(51) Int. Cl.
    *G01J 5/08* (2006.01)
(52) U.S. Cl. .......................... 250/342; 250/353
(58) Field of Classification Search ............... 250/342, 250/353, DIG. 1; 340/556
    See application file for complete search history.

(56) References Cited

U.S. PATENT DOCUMENTS

| | | | |
|---|---|---|---|
| 4,820,938 A | | 4/1989 | Mix et al. ........................ 307/117 |
| 5,128,654 A | * | 7/1992 | Griffin et al. ................... 340/567 |
| 5,406,073 A | * | 4/1995 | Sharp et al. .................... 250/221 |
| 5,626,417 A | * | 5/1997 | McCavit ........................ 362/276 |
| 5,886,821 A | * | 3/1999 | Sohn ............................. 359/619 |
| 6,324,008 B1 | * | 11/2001 | Baldwin et al. ............... 359/619 |
| 6,376,840 B1 | * | 4/2002 | Ko ................................. 250/353 |
| 6,388,573 B1 | * | 5/2002 | Smith et al. ................... 340/556 |
| 2005/0116171 A1 | * | 6/2005 | Lee et al. ........................ 250/342 |
| 2006/0266944 A1 | * | 11/2006 | Chi et al. ....................... 250/353 |
| 2007/0152156 A1 | * | 7/2007 | Zhevelev et al. ......... 250/339.14 |
| 2007/0177384 A1 | * | 8/2007 | Sibalich et al. ............... 362/276 |
| 2008/0002396 A1 | * | 1/2008 | Sandell ......................... 362/147 |
| 2008/0174429 A1 | * | 7/2008 | Jensen et al. .................. 340/565 |
| 2008/0316025 A1 | * | 12/2008 | Cobbinah et al. ............ 340/552 |

* cited by examiner

*Primary Examiner* — David P Porta
*Assistant Examiner* — Mark R Gaworecki
(74) *Attorney, Agent, or Firm* — Jag Patent Services LLC; James A. Gavney, Jr.

(57) ABSTRACT

A detection field selectable motion sensor that includes a modulator having a output with a shaped response to received radiation emissions forming a detection field and a sensor configured to detect the output from the modulator. The motion sensor can be configured with a set of lenses that can be aligned with the sensor. Further, the motion sensor can be an active sensor that transmits electromagnetic radiation which is detected after reflection from a detection field. Infrared radiation is the preferred source of received and transmitted radiation but microwave or visible light can be used. For an active motion detection either coherent or incoherent radiation can be used. The motion sensor includes a means for mounting and a hinge or swivel for orientating the sensor.

12 Claims, 5 Drawing Sheets

SELECTABLE FIELD MOTION DETECTOR

FIELD OF THE INVENTION

The invention relates to motion detectors. More particularly, the present invention relates to motion detectors which utilize selectable lenses to configure the detector's detection area.

BACKGROUND OF THE INVENTION

A number of different motion detector systems are known. One type of motion detector utilizes ultrasonic radiation, such as described in U.S. Pat. No. 4,820,938 issued to Mix et al. In an ultrasonic motion detector, a detection field of ultrasonic radiation is generated and is monitored for Doppler shifts, which are indicative of motion. Such motion sensors are integrated with a light management system, wherein lights are turned off, turned on and/or are dimmed according to the detection of motion or a lack of detected motion.

One of the shortcomings of current motion detector systems and devices is that they typically are only effective for detecting motion in a small area and are ineffective at monitoring motion at or near walls. Accordingly, these motion detector systems and devices typically require that detector units are strategically positioned in corners of a room or in a narrow corridor, such that the detector units broadcast through the room or corridor into an area where motion is most likely to occur. Despite the strategic positioning of the detector units, such devices and systems are ineffective at monitoring motion at or near walls or through an entire room. Such systems or devices can be protrusive and unattractive.

Further, it is generally preferably to have a ultrasound motion detectors that operate at a sufficiently high frequency (about 40 KHz) such that interference with hearing aides, and the like, are minimized. Unfortunately, the energy of ultrasound waves at these higher frequencies are attenuated by air to a greater degree than lower frequencies. Accordingly, motion defectors which operate at these high frequencies can require several transducers to effectively detect motion in a room.

In view of the aforementioned shortcomings, what is need is a motion detector system and device with the flexibility to change the size and shape of the detection area and thereby giving the system the flexibility to be mounted in more places and provide better coverage with fewer sensors. Further, what is needed is a motion detector that does not interfere with hearing aids.

SUMMARY OF THE INVENTION

In the first aspect of the invention, a selectable detection field motion sensor is disclosed. The motion sensor includes a modulator that has a shaped response to received electromagnetic radiation and thereby forming a detection field. The motion sensor includes a sensor receiving the modulator output. The modulator can be a shaped lens including a Fresnel lens. The modulator can selectively pass electromagnetic radiation through the modulator to the sensor. The selective frequencies can include infrared, microwave, visible light frequencies, or ultraviolet. The electromagnetic radiation can include coherent (laser) radiation in the infrared, visible, or ultraviolet spectrum. The use of a modulator that polarizes the electromagnetic radiation is also contemplated by this invention.

In one embodiment of the motion sensor, the modulator includes a set of selectable lenses where each lens has a different response beam (shape) to received electromagnetic radiation. Each lens, from the set of lenses, can be moved into alignment with the sensor and thereby configuring a motion detector's responsiveness to form different detection fields. The lenses can be coupled to a wheel or a housing. A lens can be aligned with the sensor by rotation of the wheel, sliding the housing, or rotating the housing. The selection of one of the set of lenses can be through manual or electromechanical means. The electromechanical means can be connected to an electronic controller which will automatically select the lens based on factors such as the received signal, the time of day, or other preprogrammed factors.

In one embodiment of the invention, the motion sensor includes a transmitter of electromagnetic radiation. Preferably the transmitted radiation reflects off an object in the detection field and is received by the sensor. The transmitter can radiate infrared, microwave, visible light, or ultraviolet electromagnetic radiation. Preferable, the radiation is infrared. The transmitted radiation can be narrow or wideband, preferably narrowband. Additionally, the electromagnetic radiation can be coherent (a laser), incoherent, or polarized. Preferably, the radiation received by the lens and detected by the sensor is the transmitted radiation reflected from the detection area.

The motion sensor can be mounted on a bracket that can be tilted in one or more directions. By being able to tilt the motion sensor, the detection area can be changed to better match the beam shape of the selected lens with the area to be monitored and thereby providing improved monitoring of an area of interest with fewer motion detectors. A hinge or swivel mount can be used to orientate the motion sensor. Preferable, the mount has a friction mechanism for the motion sensor to retaining a given position on the hinge.

BRIEF DESCRIPTION OF THE DRAWINGS

The invention is better understood by reading the following detailed description of the exemplary embodiments in conjunction with the accompanying drawings.

DETAILED DESCRIPTION OF THE INVENTION

The following description of the invention is provided as an enabling teaching of the invention in its best, currently known embodiment. Those skilled in the relevant art will recognize that many changes can be made to the embodiment described, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present inventions are possible and may even be desirable in certain circumstances, and are a part of the present invention. Thus, the following description is provided as illustrative of the principles of the present invention and not in limitation thereof, since the scope of the present invention is defined by the claims.

Figure 1A:
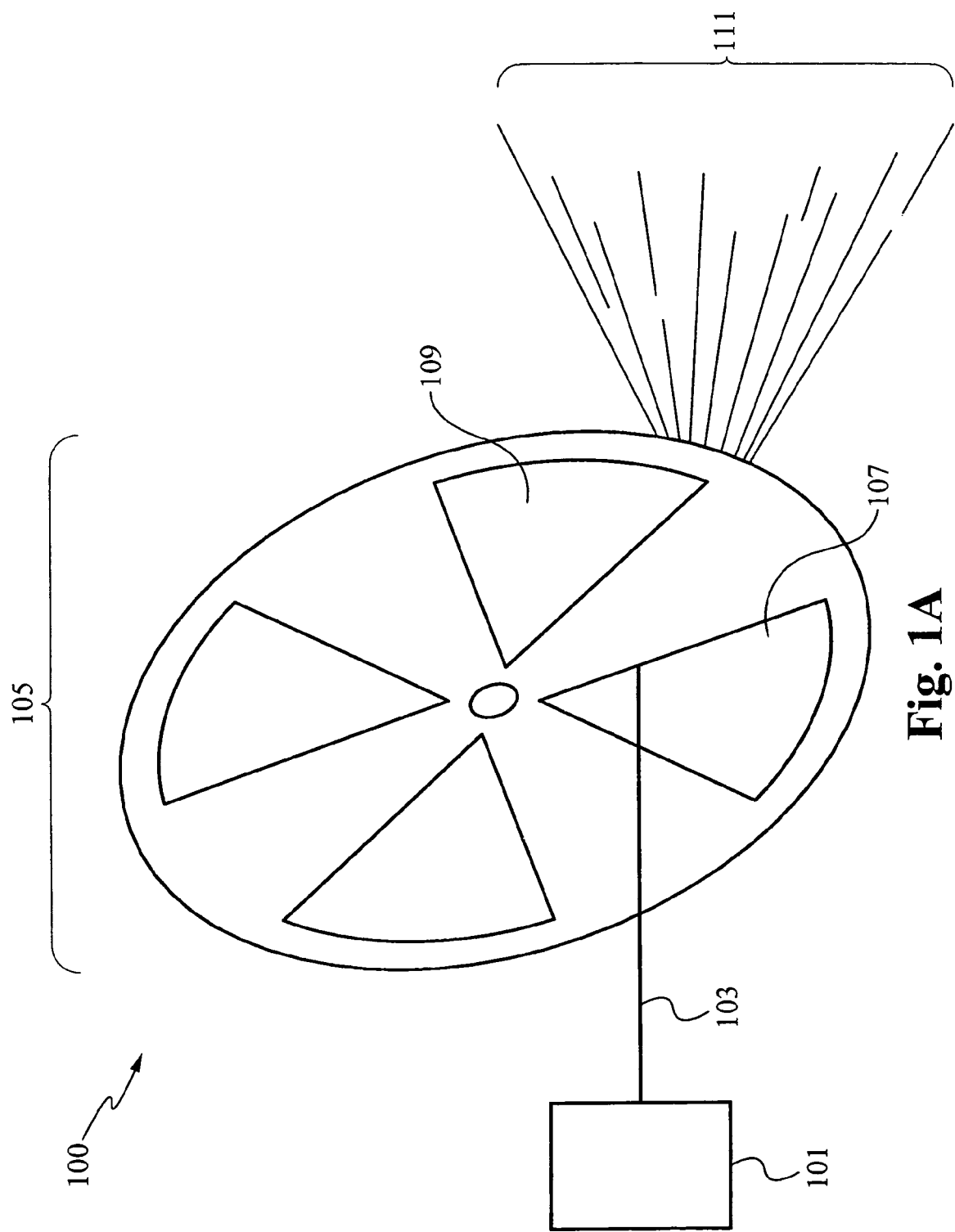
FIG. 1A illustrates a wheel with a set of lenses, selectably aligned with the sensor by wheel rotation, generating different detection areas through the different lens response patterns.

FIG. 1A illustrates one embodiment of the invention. The motion detector 100 includes a sensor 101 and a wheel with set of lenses 105. Each lens 107 and 109 can have a different shape response to received electromagnetic radiation and thereby define a different detection areas.

The lens 107 is aligned with the sensor 101 along a path 103 such that the electromagnetic radiation reflecting from a detection area 111 and passes through the lens 107 and shaped to substantially impart on the sensor 101. The lens 109 not aligned with the sensor 101 can be rotated into alignment. Each lens 107 and 109 can have a different beam shape for the received electromagnetic energy and is configured to rotate into alignment with the sensor 101. The wheel 105 is configured to rotate where different lenses align with the sensor 101.

The lens 107 can function as a wide angle lens with a wide field of view and thus a wide detection area. Alternatively, the lens 107 can form a narrow beam, focusing electromagnetic radiation from a small field for viewing and thus forming a small or narrow detection area. Further, the lens 107 can have differing responses along each axis. For example, the lens 107 could have a narrow beam in one axis and has a wide beam in the other axis. This would provide a vertical or horizontal slot or rectangular shaped response pattern. Further, the lens 107 can be responsive to a broad range of electromagnetic energy or can be selectively pass and refract to, infrared, visible light, or microwave frequencies.

Figure 1B:
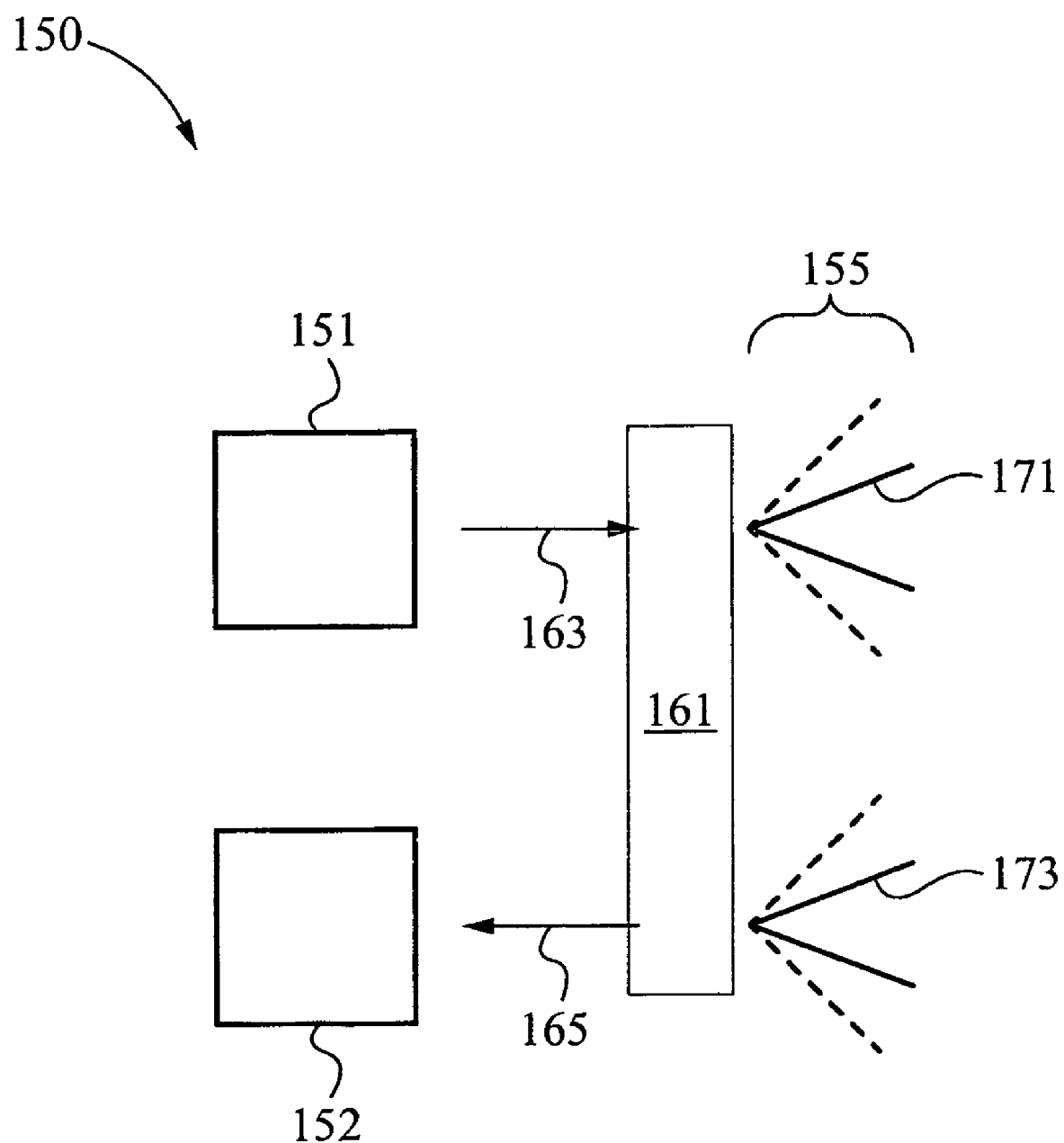
FIG. 1B illustrates a receiver and transmitter parts of a motion sensor operating through a modulator shaping the received and transmitted radiation and thereby modifying the detection area.

FIG. 1B illustrates one embodiment of an active motion detector 150. The sensor is comprised of a transmitter 151, a receiving sensor element 152, and a modulator 161. The transmitting element 151 generates electromagnetic radiation including but not limited to microwave, infrared, visible light, and ultraviolet. The transmitting element 151 can generate coherent or incoherent radiation.

The transmitted radiation 163 is sent through the modulator 161. The modulator 161 can refract and shape the transmitted radiation. Further, the modulator 161 can selectively pass ranges of electromagnetic frequencies. This has the benefit of making it possible to select a transmitter with a wider bandwidth than necessary but still output into the environment narrow band radiation 171. Further, preferably, the modulator (lens) refracts the electromagnetic radiation of interest 163 and 173.

The lens 161 refraction pattern creates a desired transmission beam pattern. The beam pattern can be wide or narrow or asymmetrical depending on the desired area to be monitored. Reflected electromagnetic radiation 173 is received by the modulator 161. The refraction characteristics determine the beam shape and thus a detection area. The modulated electromagnetic radiation 165 is transmitted to the receiving sensor 152. While the modulator 161 is shown as single lens, multiple lenses are contemplated. Preferably beam shape for the transmitted radiation is the same as for the received radiation but different beam patterns between the receiver 152 and then transmitter 151 are contemplated.

Figure 2A:
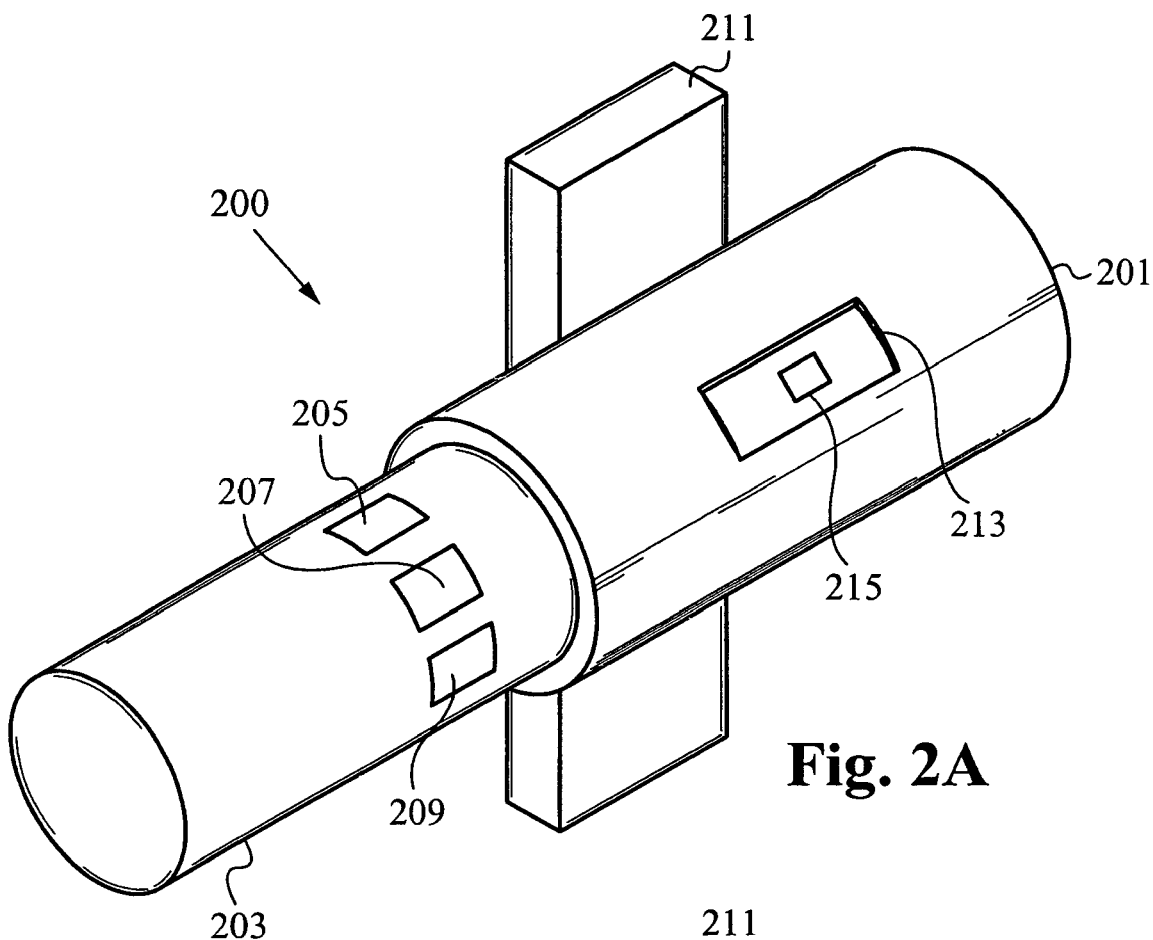
FIG. 2A illustrates a motion sensor with a member and housing, where the member contains a sensor and the cylindrical housing contains a set of lenses where the lenses are positioned radially around the cylinder.

FIG. 2A illustrates another embodiment of the motion detector 200. The motion detector 200 includes sensor 215 mounted inside a member 201, a mounting bracket 211, and a housing 203 with a set of lenses 205, 207, and 209 coupled radially around the cylindrical housing 203 that is slideably coupled to the member 201.

The housing 203 is designed for a set of lenses 205, 207, and 209 to be coupled to the housing 203. Further, the housing 203 is configured to slide into the member 201 for assembly. The housing 203 is preferably a hollow cylinder so that the sensor 215 can be configured into the housing 201 and for there to be a path between the sensor 215 and a lens 205, 207, and 209 when aligned with the sensor 215 and the aperture 213. Preferably, the housing 203 is positioned such that the lenses are in the plane of the aperture. Additionally, the housing 203 should be coupled with the member 201 such that the housing can rotate sufficiently for each lens 205, 207, and 209 to aligned with the sensor 215 and the member aperture 213.

The lenses 205, 207, and 209 are shown coupled to the housing 203. Preferable the lenses 205, 207, and 209 are coupled to the housing at the edges of the lenses. The coupling can be with a mechanical structure (not show), a pressure fit, or with an adhesive. It is preferable that there are not structures that substantially block the path between the sensor and the aperture and thus impede or distort the reception of electromagnetic radiation through a lens 205, 207, and 209 to the sensor 215. The lenses 205, 207, and 209 can be formed out of any material that is substantially transparent to the electromagnet radiation being detected. The lenses can transmit a broad range of electromagnetic frequencies or can be frequency selective and transmit a narrow range of frequencies. For example, the lenses 205, 207, and 209 could be made of a material that passes infrared but not visible radiation. Using a lens that is frequency selective enables the use of a sensor that can be responsive to a wider range of electromagnetic radiation. Thus by using lenses that only pass infrared, a sensor that responds to both the visible and the infrared spectrum can be used to detect electromagnetic radiation in only the infrared spectrum. This can be useful in selecting sensors based on cost or availability.

The lenses are shaped to provide different beam patterns or shaped responses. This in turn determines the selectivity and area of coverage of the motion detector. The more the emitted or reflected electromagnetic radiation is outside of the lens beam, the weaker the received signal by the sensor. Thus, the beam formed by the lenses 205, 207, and 209 determines a detection area. A lens can have a symmetrical or asymmetrical beam pattern. Further, the lens can have a wide angle beam or narrowly focused beam. Preferable, each of the set of lens have a different beam and thus provides different detection areas.

The member 201 is coupled to the bracket 211, contains a sensor 215, and is configured to accept the housing 203. The member has an aperture 213 preferably aligned with the sensor 215. The aperture 213 is preferable larger than the sensor 215. Preferably the member 201 is configured for the lenses 205, 207, and 209 in the housing 203 to align with the member aperture 213. Further, the member 201 is preferable configured to allow the housing 203 to rotate within the member 201. The method for rotating the housing can be manually or by an electrical mechanical devices (not shown).

The mounting bracket 211 can be of any size, shape, and material suitable for mounting to another structure. Further, the mounting bracket can include a hinge (not shown) or swiveling device (not show) that enables the member 201 to be moved and thus moving the lens 205, 207, and 209 beam and thereby provide a selectable detection area. The ability to orientate the member can be in one or two dimensions. Also, within the contemplation of the invention is the ability of the member 201 to be positioned at any point along the mounting bracket 211.

Figure 2B:
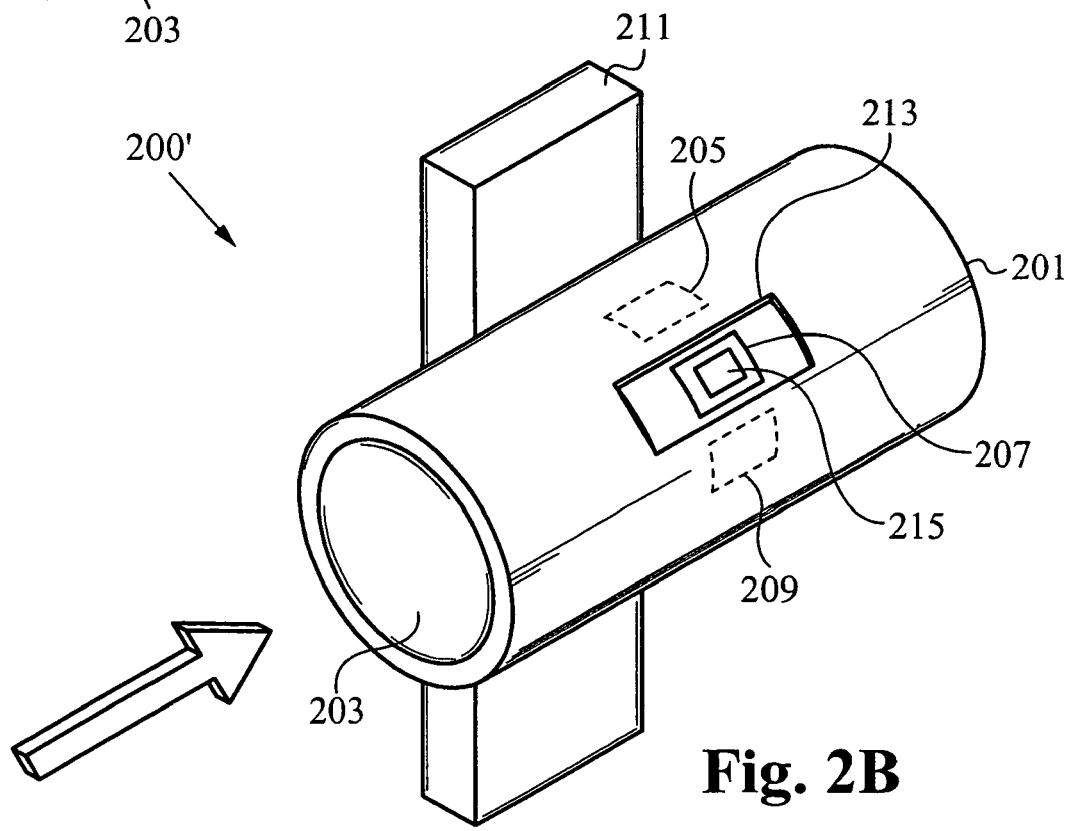
FIG. 2B illustrates the cylindrical housing and member of FIG. 2A with a lens aligned with the member aperture and sensor.

FIG. 2B illustrates the motion detector 200' with the housing 203 inserted into the member 201 with the lens 207 aligned with the aperture 213.

Figure 3A:
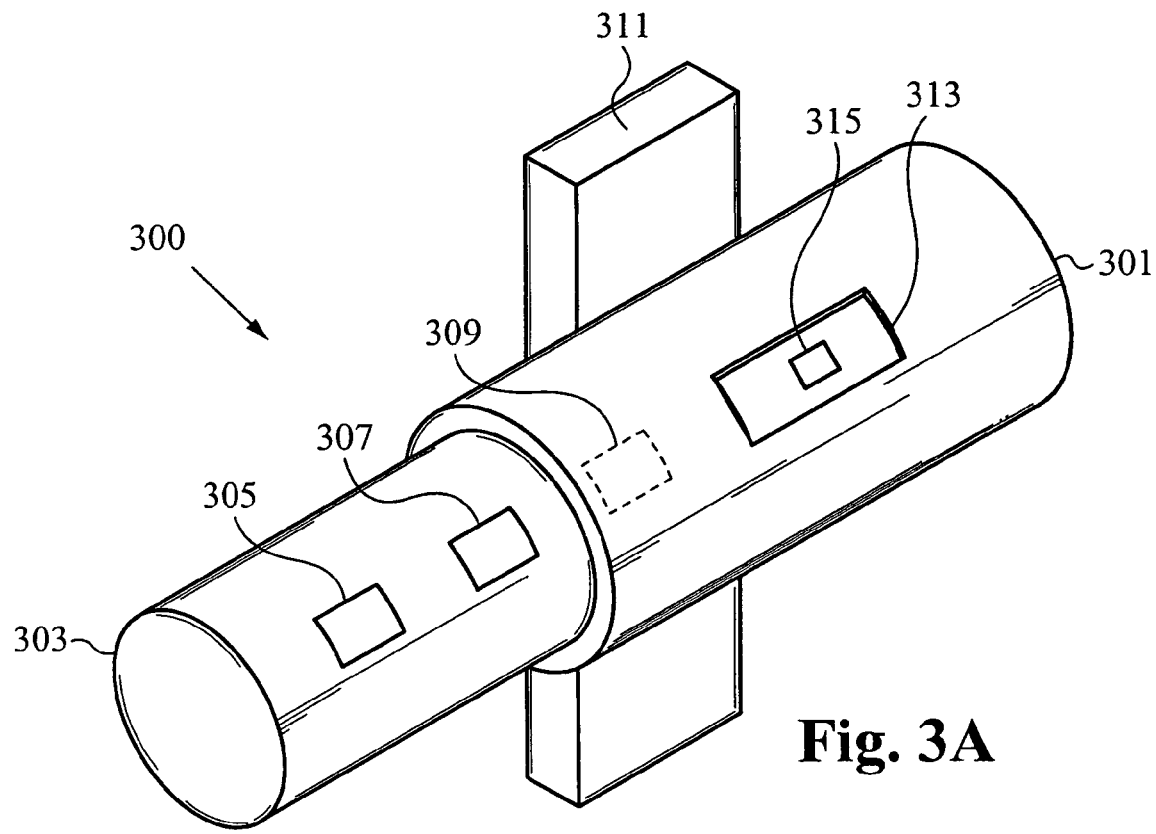
FIG. 3A illustrates a motion sensor with a member and housing, where the member contains a sensor and the cylindrical housing contains a set of lenses where the lenses are positioned along an axis around the cylinder.

FIG. 3A illustrates an alternative motion detector 300 from the motion detector 200 illustrated in FIG. 2A. In this embodiment, lenses 305, 307, and 309 are coupled to the housing 303 along the central axis of the housing 303. The alignment of the lens 309 with the aperture 315 and with the sensor 313 is performed by moving the housing within the member 301 along the central axis. A different lens can be selected by moving the housing 303 along the central axis. The operation of the bracket 311 and the lenses 305, 307, and 309 are the same as described above for FIG. 2A.

Figure 3B:
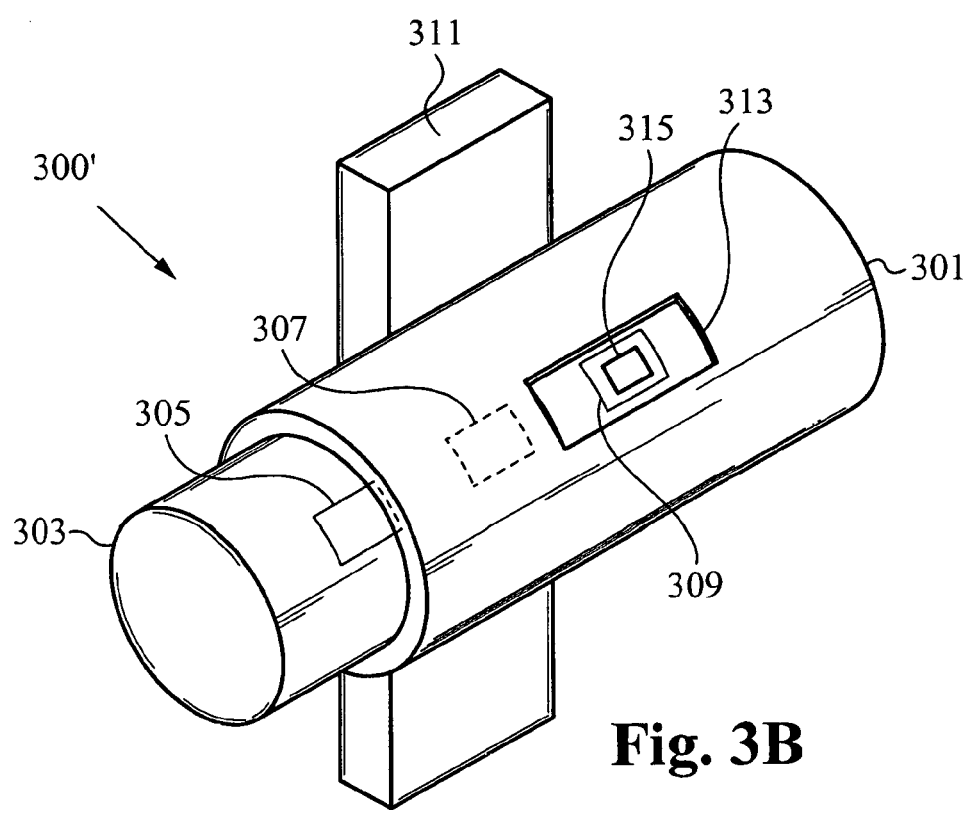
FIG. 3B illustrates the cylindrical housing and member of FIG. 2A with a lens aligned with the member aperture and sensor.

FIG. 3B illustrates the motion detector 300 with the housing positioned with a lens 309 aligned with the sensor 315 and the member aperture 313. The housing 303, member 301, bracket 311 and lenses 305, 307, and 309 are as described above for the structure in FIG. 2A.

Figures 4A, 4B:
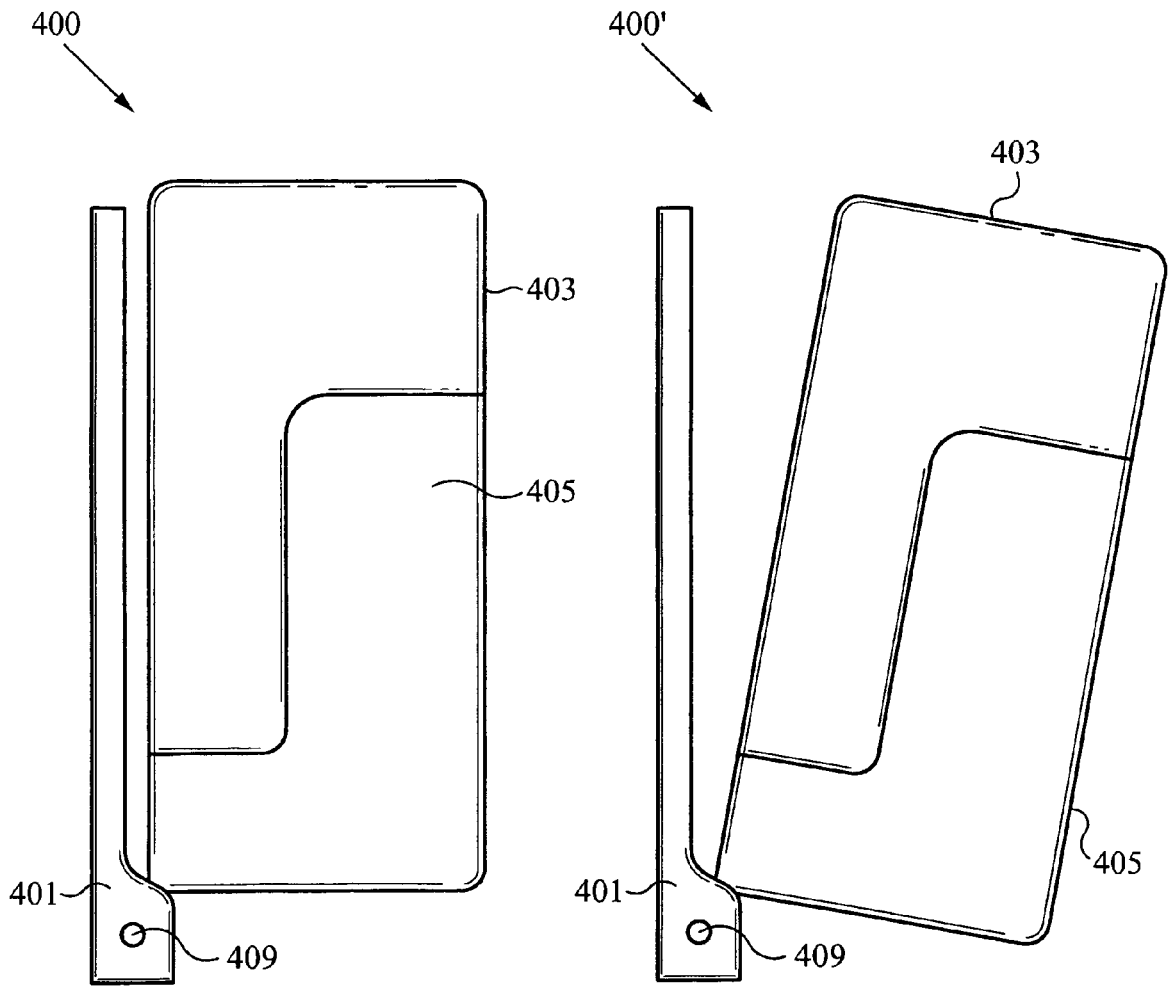
FIG. 4A illustrates a motion detector coupled to a bracket with a hinge.
FIG. 4B illustrates a motion detector coupled to a bracket with a hinge in a tilted configuration.

FIG. 4A illustrates one embodiment of the motion detector 400. The housing 403 that can contain the selectable lenses is coupled to the member 405 that can contain the sensor. The member 405 assemble is coupled to the bracket 401 through a hinge 409. The hinge 409 allows the motion detector 400 to pivot away from the bracket 401 and thus allow the detection area to be orientated as needed. The hinge 409 can include a friction mechanism (not shown) to hold the motion detector 400 in a given position. Also contemplated are other means for coupling the bracket 401 to the member 405 including a swivel mounting that would allow for orientation of the motion sensor in two directions.

In operation, the motion detector 400 is mounted on a structure (not shown) using the mounting bracket 401. This structure can include but is not limited to an indoor or outdoor wall, a ceiling, or a pole. Next, a lens 207—FIG. 2B that is appropriated for the area of detection is selected. For example, a hallway might be best served by a tall narrow beam so the lens that provides such a response is selected from the set of lenses. This lens provides greater sensitivity to reflective electromagnetic radiation at a greater distance. Alternatively, for a larger room such as living room or an office, a wide angle lens would best operate to cover a large detection area. For a crawl space or an attic, a lens with a beam that is wide and narrow would provide the best detection area. If the detection area is a small, such as a window or door, a lens with a circular response can be provided.

The system could operate in an active or passive mode. In the passive mode, the sensor receives electromagnetic radiation generated or emitted from the detection area. For example, a person walking through the detection area could cause an increase an increase in the infrared radiation. In an active mode, the transmitter 151—FIG. 1B sends a signal, that can be shaped by a lens 107—FIG. 1A, preferably infrared, that is reflected off an object in the detection area. The reflected infrared radiation is detected by the sensor 101—FIG. 1A after being shaped by a lens. Either a doppler shift of a change in sensor level can be used in the detection of an object or person in the detection area. The transmitted electromagnetic radiation can be constant, pulsed, or periodic.

What is claimed is:

1. A motion sensor comprising:
   a) a modulator having an output with a shaped response to received radiation emissions from a range of different detection fields, wherein the modulator includes lenses that are separately mounted to a tubular housing and wherein each of the lenses are configured to be moved into alignment with the sensor by sliding the tubular housing in and out of a member with an aperture to form the range of different detection fields; and
   b) a sensor configured to detect the output.

2. The motion sensor of claim 1, wherein the output is infrared, radar, or laser radiation.

3. The motion sensor of claim 1, wherein the lenses include Fresnel lenses.

4. The motion sensor of claim 1, further comprising an adjustable bracket for changing the detection field.

5. The motion sensor of claim 4, wherein the adjustable bracket is movable in one axis.

6. The motion sensor of claim 1, further comprising means for generating the radiation emissions.

7. The motion sensor of claim 6, wherein the means for generating the radiation emissions are an infrared, radar, or laser transmitter.

8. A motion sensor comprising:
   a) a sensor with a transmitter and receiver mounted to a member; and
   b) a modulator comprising a movable housing with lenses that are each configured to selectively be positioned in front of the sensor by sliding the movable housing up and down relative to the member to generate a range of different detection fields.

9. The motion sensor of claim 8, wherein the member is tubular and the movable housing is tubular.

10. The motion sensor of claim 8, wherein the lenses are Fresnel lenses.

11. The motion sensor of claim 8, further comprising an adjustable bracket for changing position of the detection fields.

12. The motion sensor of claim 8, wherein the sensor is an infrared sensor.

* * * * *